(12) United States Patent
Durham et al.

(10) Patent No.: US 7,488,913 B1
(45) Date of Patent: Feb. 10, 2009

(54) MOUNTABLE CIRCUIT BREAKER

(75) Inventors: Larry Marshall Durham, Winston-Salem, NC (US); Timothy Bernard Hasenour, Clemmons, NC (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 12/033,153

(22) Filed: Feb. 19, 2008

(51) Int. Cl.
*H01H 5/00* (2006.01)

(52) U.S. Cl. .............. 200/400; 200/48 R; 335/202; 335/169; 439/810; 361/600

(58) Field of Classification Search .......... 200/400, 200/48 R; 335/202, 23–27, 35–47, 169–176; 439/810, 813–814; 361/600
See application file for complete search history.

(56) References Cited

U.S. PATENT DOCUMENTS

| | | | |
|---|---|---|---|
| 4,351,620 A | 9/1982 | Stritt et al. | |
| 4,454,382 A | 6/1984 | Borne et al. | |
| 4,900,275 A | 2/1990 | Fasano | |
| 5,047,604 A | 9/1991 | Grass et al. | |
| 5,318,462 A | 6/1994 | Oakley | |
| D349,274 S | 8/1994 | Kian et al. | |
| 5,480,310 A | 1/1996 | Baum | |
| 5,486,979 A | 1/1996 | Bowen et al. | |
| 5,768,091 A * | 6/1998 | Vinson et al. | 361/601 |
| 5,880,927 A | 3/1999 | Kent et al. | |
| 5,907,476 A | 5/1999 | Davidsz | |
| 6,017,251 A | 1/2000 | Rittmann | |
| 6,059,129 A | 5/2000 | Bechaz et al. | |
| 6,062,914 A | 5/2000 | Fasano | |
| 6,278,605 B1 * | 8/2001 | Hill | 361/600 |
| D459,259 S | 6/2002 | Harding et al. | |
| 6,563,697 B1 | 5/2003 | Simbeck et al. | |
| 6,806,799 B2 | 10/2004 | Runyan | |

* cited by examiner

*Primary Examiner*—Kyung Lee

(57) ABSTRACT

A mountable circuit breaker is disclosed. The circuit breaker includes a housing having first and second housing members and a latch member. The housing defines a rail receptacle for mounting the circuit breaker on an elongated channel rail. The latch member includes a base portion that includes a movably positionable retainer that moves toward or away from a biased position that is established by a stem portion of the latch member. Movement away from the biased position expands the rail receptacle for mounting the circuit breaker to the rail channel when an external force is applied to a tool receptacle adjacent the junction of the base and stem portions of the latch member. Removing the external force results in the base portion returning to its biased position, securing the circuit breaker to the channel rail.

16 Claims, 4 Drawing Sheets

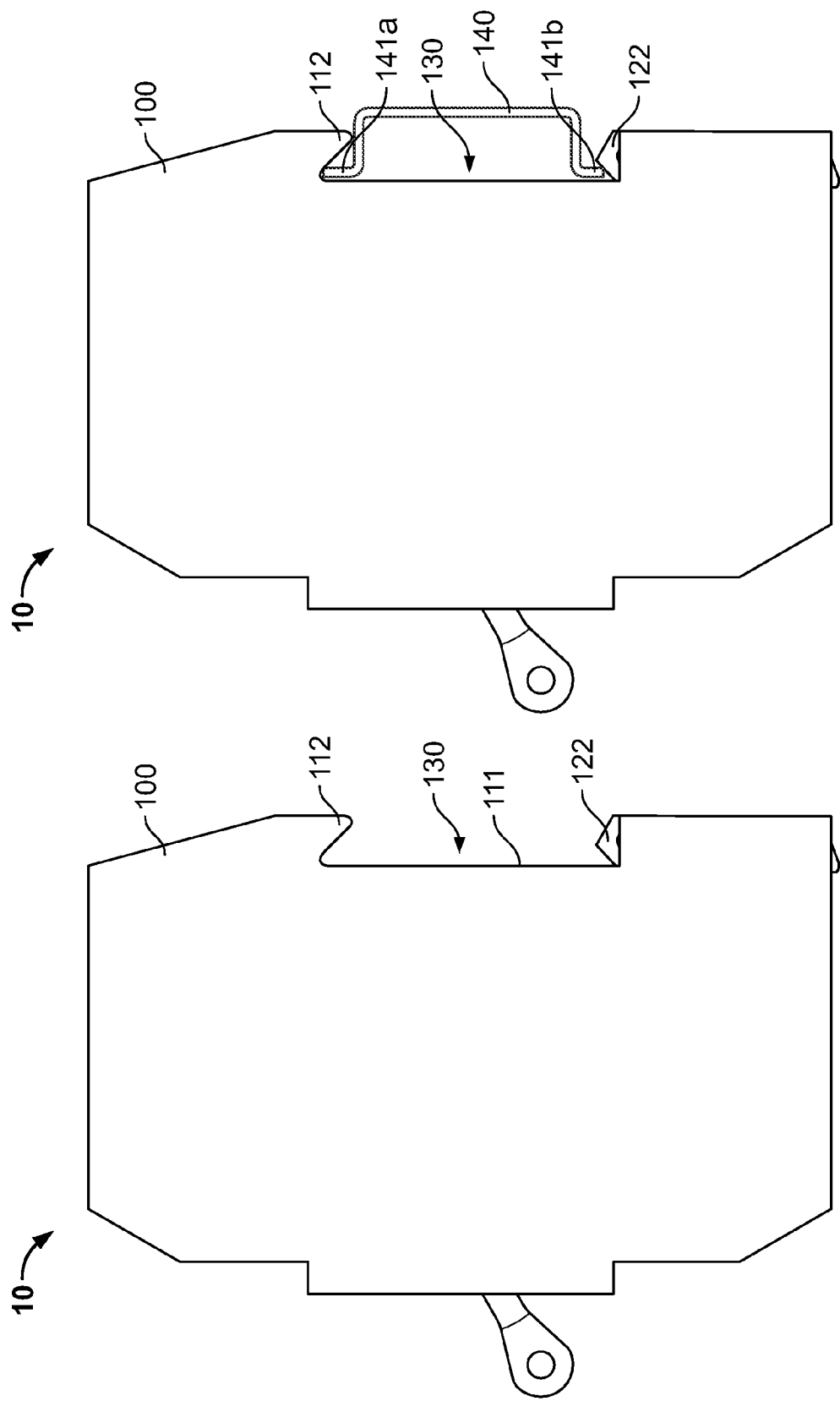

MOUNTABLE CIRCUIT BREAKER

FIELD

This application is directed to circuit breakers, and more particularly to circuit breakers that include a housing that is mountable on a channel rail.

BACKGROUND

A DIN rail, sometimes referred to as a top-hat rail, is a standardized elongated channel rail having laterally spaced oppositely projecting abutment flanges that gives it a cross-section having a hat-shaped appearance. DIN rails are widely used for mounting circuit breakers inside equipment racks, particularly in Europe.

Prior art DIN rail mountable circuit breakers generally fall into one of two categories. In the first, the circuit breakers have a fixed opening, requiring they be mounted onto the rail at one of the rail's ends and slid along the rail into position. In the second, the circuit breakers have a variable opening for clamping over the rail. Embodiments which are only slidable face the disadvantage that if the circuit breaker needs to be replaced, significant amounts of work can be involved in disconnecting and/or removing adjacent breakers and other items until the faulty breaker can be slid entirely off of the rail. Current versions of embodiments that employ a clamping mechanism are subject to overstressing, which can result in breaking the circuit breaker.

These and other drawbacks are found in current DIN rail mountable circuit breakers.

SUMMARY

A circuit breaker and a circuit breaker housing are disclosed. The circuit breaker housing includes first and second housing members and a latch member. The housing defines a rail receptacle for mounting the circuit breaker on an elongated channel rail. The latch member includes a base portion which includes a movably positionable retainer that moves toward or away from a biased position that is established by a stem portion of the latch member. Movement away from the biased position expands the rail receptacle for mounting the circuit breaker to the rail channel when an external force is applied to a tool receptacle adjacent the junction of the base and stem portions of the latch member. Removing the external force results in the base portion returning to its biased position, securing the circuit breaker to the channel rail.

According to one exemplary embodiment of the invention, a circuit breaker for mounting to an elongated channel rail having laterally spaced oppositely projecting abutment flanges includes a circuit breaker housing having a first housing member, a second housing member complementary and attached to the first housing member and a latch member disposed intermediate the first and second housing members. At least one of the first or second housing members has an elongated linear latch guide formed therein. The latch member includes a base portion, a stem portion extending from the base portion at a junction, a tool receptacle formed in the base portion adjacent the junction of the stem portion, and an elongated linear latch guide formed in the base portion. The linear latch guide formed in the base portion of the latch member is cooperable with the at least one elongated linear latch guide formed in the housing member to establish a distance of maximum travel of the base portion. The junction establishes a retainer segment having a length at least 75% of the total length of the base portion.

The circuit breaker housing includes a rail receptacle for removably securing the housing to the elongated channel rail. The rail receptacle is at least partially defined by oppositely disposed retainers extending inwardly toward the rail receptacle to at least partially surround the abutment flanges within the rail receptacle. At least one of the retainers is movably positionable away from a biased position to receive the elongated channel rail in the rail receptacle upon application of an applied external force and the movably positionable retainer is configured to return to the biased position in the absence of the applied external force. The base portion of the latch member forms the movably positionable retainer and moves toward or away from the biased position along a path of travel defined by the elongated linear latch guides. The biased position is established by securing an end of the stem portion at a pre-determined location in at least one housing member.

An advantage of exemplary embodiments of the invention include that adding a latch guide that prevents the latch from moving beyond the distance required to clear the DIN rail, the stem portion of the latch is prevented from being overstressed by a user placing too much force on the tool used to remove the circuit breaker from the DIN rail. Additionally, the linear latch guide can further reduce overstressing by guiding the latch member to move along a plane when moving away from or toward the rail receptacle.

Furthermore, by positioning the tool receptacle adjacent the junction of the base and stem portions of the latch member, the leverage point for expanding the rail receptacle is much closer to the pivot point of the stem portion and the likelihood of overstressing and/or breaking the latch member is further reduced.

Other features and advantages of the present invention will be apparent from the following more detailed description of exemplary embodiments, taken in conjunction with the accompanying drawings which illustrate, by way of example, the principles of the invention.

BRIEF DESCRIPTION OF THE DRAWINGS

FIGS. 1a and 1b each illustrate, respectively, a side view of a circuit breaker in accordance with an exemplary embodiment of the invention prior to and after mounting on a DIN rail.

FIG. 2a illustrates an alternative view of the unmounted circuit breaker of FIG. 1a.

Where like parts appear in more than one drawing, it has been attempted to use like reference numerals for clarity.

DETAILED DESCRIPTION OF EXEMPLARY EMBODIMENTS

Figure 2B:
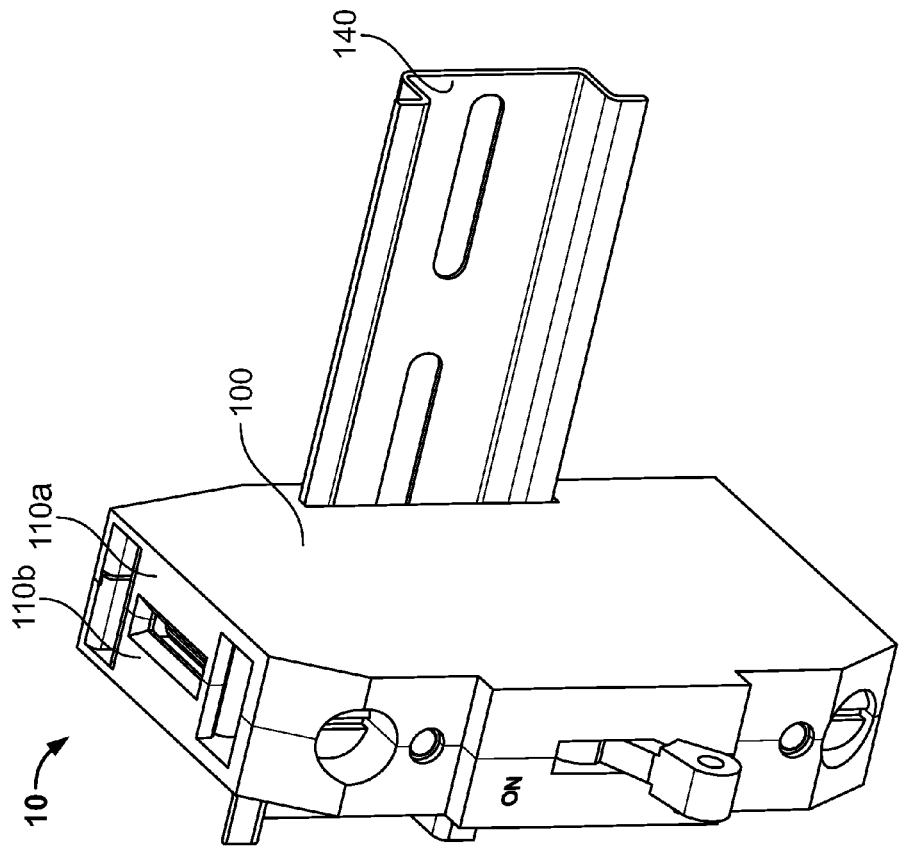
FIG. 2b illustrates an alternative view of the mounted circuit breaker of FIG. 1b.

Exemplary embodiments of the invention are directed to circuit breakers, and more particularly to circuit breakers having a housing that is capable of being mounted on an elongated channel rail. For circuit breakers, the most widely used such rail is a DIN rail (with reference to the standards agency Deutsche Institute für Normung), sometimes also referred to as a top-hat rail.

Turning to FIGS. 1a and 1b, a circuit breaker 10 is shown having a circuit breaker housing 100. The circuit breaker housing 100 includes a rail receptacle 130 to receive the DIN rail 140 (FIG. 1b) which has a pair of laterally spaced oppositely projecting abutment flanges 141a, 141b. The sides of the rail receptacle 130 are partially defined by a pair of retainers 112, 122 disposed on opposites sides of the rail receptacle and which extend inwardly toward the rail receptacle 130. The retainers 112, 122 partially surround the abutment flanges 141a, 141b of the DIN rail 140 when the rail 140 is disposed in the rail receptacle 130. As shown in FIG. 1b, each abutment flange 141a, 141b of the DIN rail 140 is pinned between a rear wall 111 of the circuit breaker housing 100 and a respective retainer 112, 122. At least one of the retainers 112, 122 is movably positionable (illustrated here as the retainer 122), which allows the distance between the retainers 112, 122 of the rail receptacle 130 to be temporarily expanded so that the circuit breaker 10 can be mounted onto the DIN rail 140 without needing to be slid from one end or the other of the DIN rail 140.

Figure 2A:
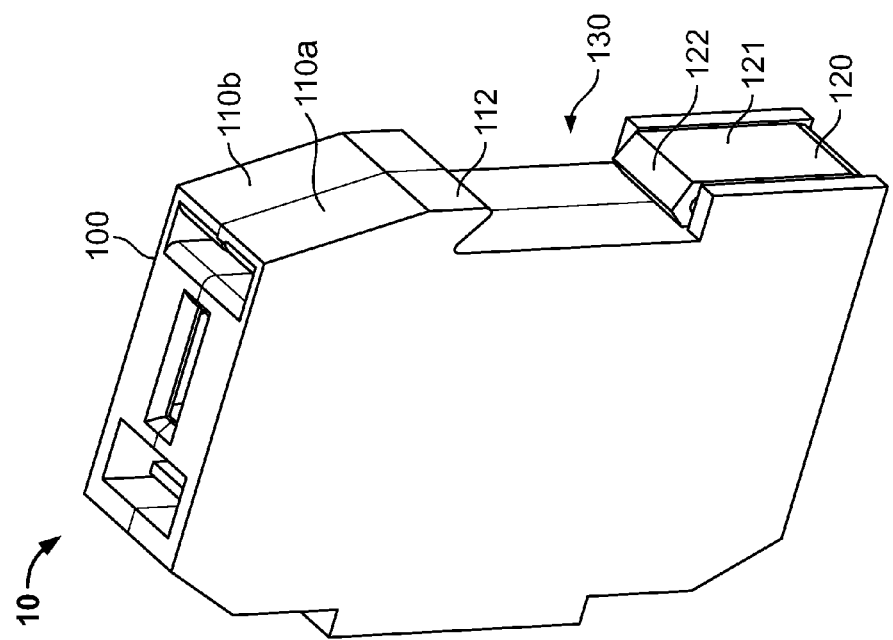

As shown in FIGS. 2a and 2b, the circuit breaker housing 100 includes first and second housing members 110a, 110b. The first and second housing members 110a, 110b are complementary to one another such that they are matable in forming the circuit breaker housing 100. The first and second housing members may be mirror images of one another, but can also be different to accommodate for various features which may be incorporated into the circuit breaker 10.

The circuit breaker housing 100 also includes a latch member 120 disposed intermediate the first and second housing members 110a, 110b, in which the movably positionable retainer 122 is formed as part of a base portion 121 of the latch member 120. The base portion 121 is situated in the housing 100 to be movable in a direction toward or away from the rail receptacle 130 so that the circuit breaker 10 can be mounted to, or unmounted from, the DIN rail 140. The base portion 121 moves along a linear path defined by cooperative elongate linear latch guides formed in at least one of the housing members 110a, 110b and the latch member 120.

Figure 3:
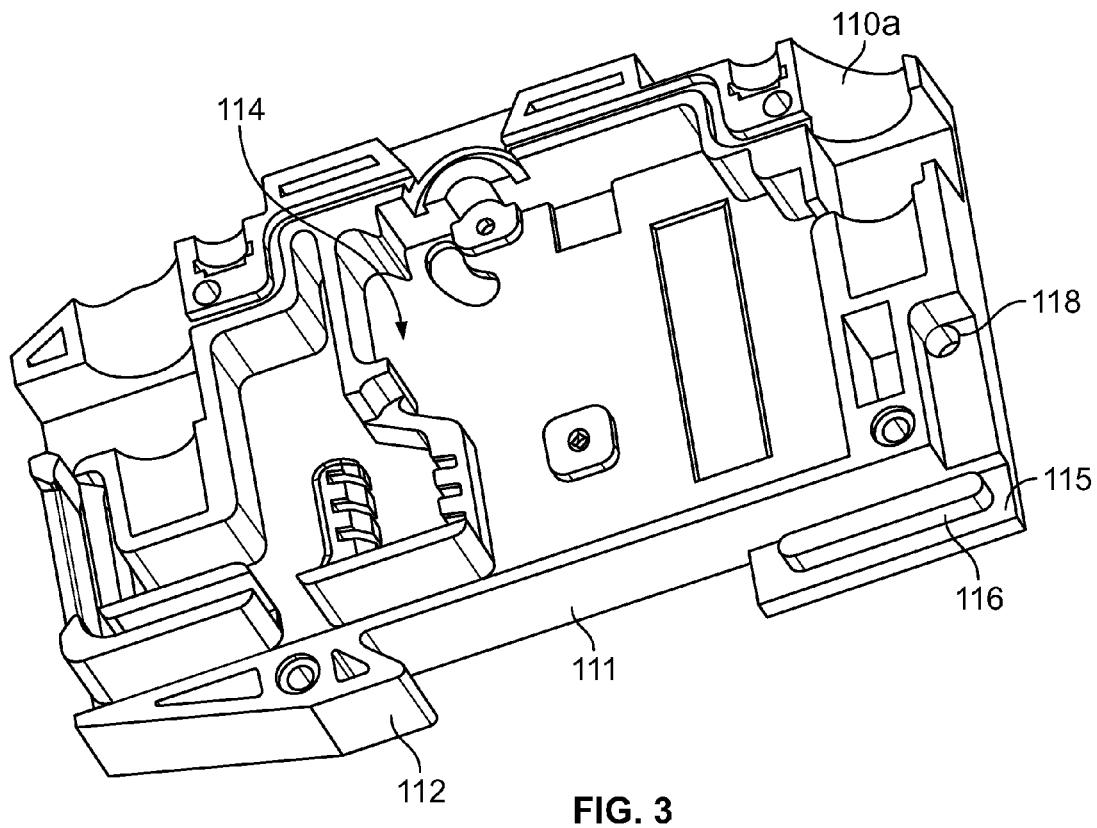
FIG. 3 illustrates a housing member of a circuit breaker housing in accordance with an exemplary embodiment of the invention.

Turning to FIG. 3, at least one of the housing members (illustrated in the Figure with respect to the first housing member 110a) includes an elongated linear latch guide 116. As illustrated, the linear latch guide 116 is a rounded, oblong protrusion rising from a platform 115 toward the opposing housing member, which platform 115 extends away from a rear wall 111 of the housing member 110b. It will be appreciated that the housing member 110b also generally includes a circuit breaker cavity 114 which may incorporate any desired features for receiving and/or retaining the working components of the circuit breaker 10 in a manner as is well known to those of ordinary skill in the art.

Figure 4:
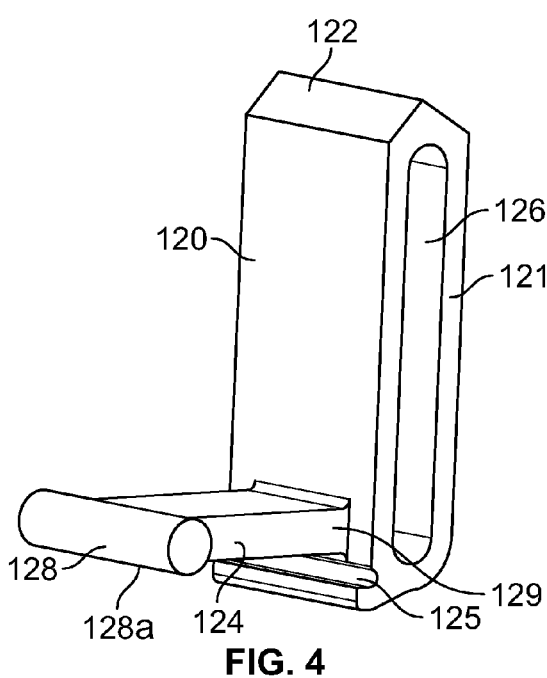
FIG. 4 illustrates a latch member of a circuit breaker housing in accordance with an exemplary embodiment of the invention.
Figure 5:
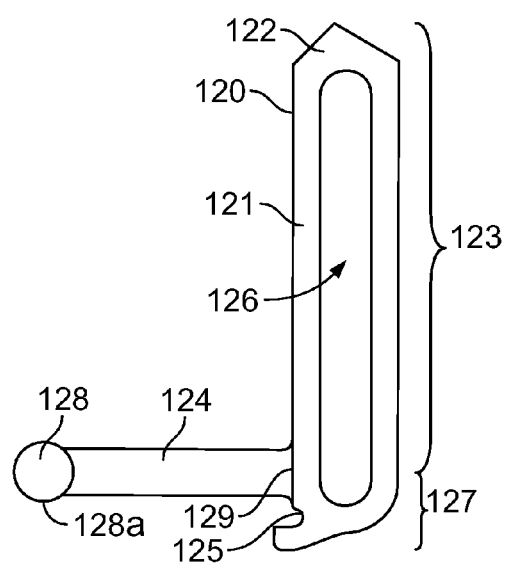
FIG. 5 illustrates another view of the latch member of FIG. 4.

FIGS. 4 and 5 illustrate the latch member 120 in accordance with an exemplary embodiment of the invention. The latch member 120 includes a base portion 121 and a stem portion 124 integral with and extending away from the base portion 121. In one embodiment, the stem portion 124 extends away from the base portion 121 substantially at a right angle.

The stem portion 124 meets the base portion 121 at a junction 129, which is positioned to divide the base portion 121 into two segments 123, 127 having unequal lengths. A retainer segment 123 extends from the movably positionable retainer 122 to the junction 129, while a tail segment 127 extends from the junction 129 to the end of the base portion 121 opposite the movably positionable retainer 122. Thus, the base portion 121 and the stem portion 124 form a substantially "L" shaped latch member 120, in which the tail segment 127 includes a tool receptacle 125 to allow for the application of an external force (such as through the use of a flat-head screwdriver) to actuate the latch member 120, as will be described in more detail below.

The distance from the movably positionable retainer 122 to the junction 129 is at least about 75% of the total length of the base portion 121 and preferably is at least about 85% of the total length of the base portion 121. Put another way, the length of the tail segment 127 is less than about one-third the length of the retainer segment 123, and preferably is less than about one-sixth the length of the retainer segment 123.

The tool receptacle 125 is formed in the tail segment 127 of the latch member 120 to receive a tool (not shown) for actuating the latch member 120 (and consequently the base portion 121 and movably positionable retainer 122 formed therein). The tool receptacle 125 is adjacent the junction 129 of the stem and base portions 124, 121 of the latch member 120, and preferably is immediately adjacent the junction 129 so as to minimize the length of the tail segment 127 and maximize the distance between the stem 124 and the movably positionable retainer 122 of the base portion 121. It will be appreciated that the tool receptacle 125 should be positioned on an exposed side of the junction 129 so that a tool can be inserted into the opening 125.

The latch member 120 includes an elongated linear latch guide 126 formed in the base portion 121 that is complementary to and cooperative with the latch guide 116 formed in the housing member 110b. The linear latch guides 116, 126 are formed to establish a maximum distance of travel of the base portion 121 away from or toward a biased position established in a manner discussed below. Preferably, the maximum distance of travel of the base portion 121 is such that the rail receptacle 130 is only expanded to the minimum width needed to insert or remove the DIN rail 140 into the rail receptacle (i.e., the distance between the laterally spaced oppositely projecting abutment flanges 141a, 141b). In this manner, even if excess force is applied that would tend to break the stem portion 124 of the latch member 120 during use, the linear latch guides 116, 126 cooperate to prevent the base portion 121 from more movement than necessary, thereby alleviating stress that would otherwise be transferred to the stem portion 124.

As illustrated, the linear latch guide 126 formed in the latch member 120 is a mortise-like opening longer than, and configured to receive, the tenon-like protrusion 116 shown in the housing member 110b (FIG. 3) and which also acts as coring for the latch member 120. It will be appreciated that the opposite configuration could be employed (i.e., a protusion from the latch member cooperating with a channel in the housing member). Any other complementary configuration that permits the movably positionable retainer 122 of the base portion 121 to slide toward or away from the rail receptacle 130 in a linear fashion could also be used. The cooperating linear latch guides 116, 126 as illustrated are preferred; it has been determined that such a configuration provides a more stable guide to keep the base portion 121 moving toward or away from the rail receptacle 130 in a substantially planar fashion.

The tool receptacle 125 and/or the opening of the latch guide 126 may extend entirely through the latch member 120 or may be recessed from the surface of the latch member 120 without extending completely through it. The latter may be preferred in some embodiments, which may assist in maintaining structural integrity of the latch member 120.

Figure 6A:
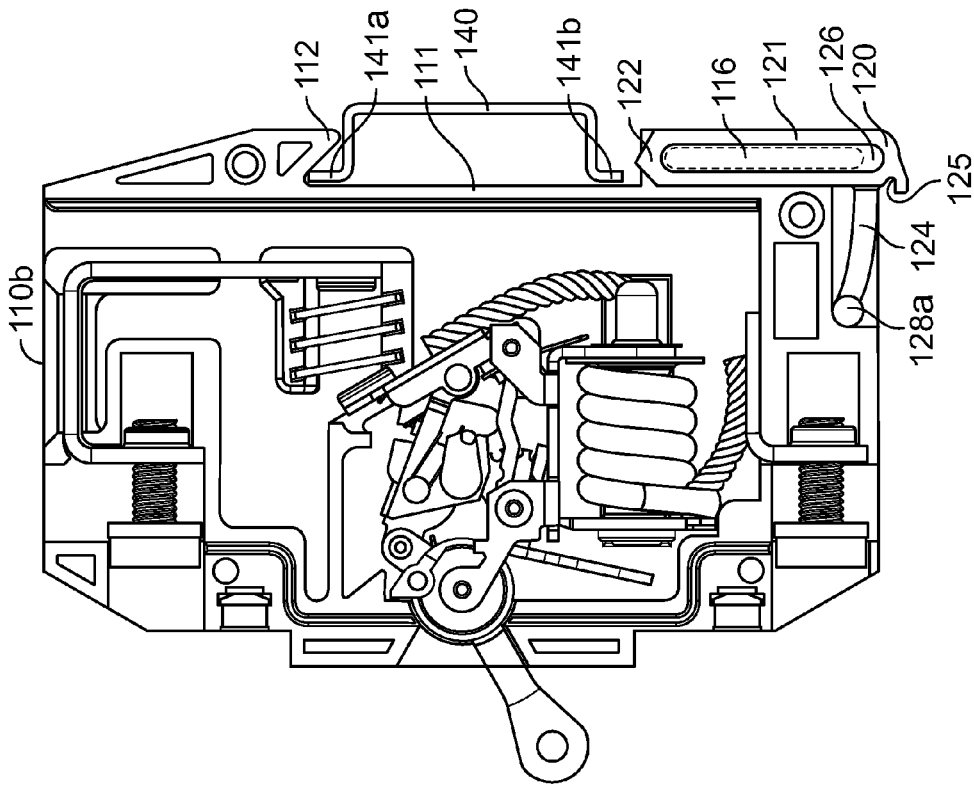
FIGS. 6a and 6b illustrate the latch member situated in a circuit breaker housing member in two different positions.
Figure 6B:
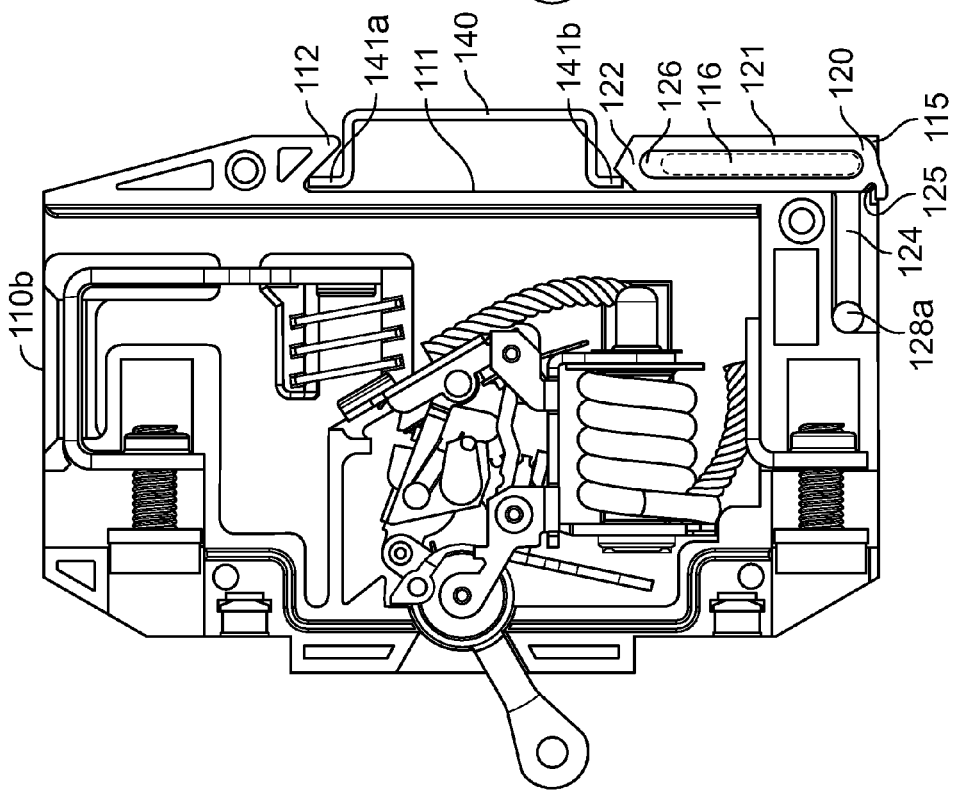

Referring now to FIGS. 6a and 6b, an end 128 of the stem portion 124 of the latch member 120 is fixed at a pre-determined location in the housing member (here illustrated with respect to the second housing member 110b). This may be accomplished, for example, by providing the end 128 of the stem portion 124 as a rock shaft 128a that is situated in a socket 118 of the housing member 110b. Thus, while the base portion 121 is free to move toward or away from a biased position along a path of travel defined by via the linear latch guides 116, 126, the stem end 128 remains at the fixed position in the housing member 110b and cannot move except to pivot by the rock shaft 128a turning in the socket 118.

As a result of fixing the end of the stem 124 at a pre-determined location, a spring-effect is achieved in which the latch member 120, and more specifically the base portion 121 and moveably positionable retainer 122 formed therein, is disposed in a biased position, such as shown in FIG. 6a. The base portion 121 can be moved away from the biased position by the application of an external force. This may be achieved, for example, by inserting a blade of a flat-head screwdriver, knife, or other tool (not shown) into the tool receptacle 125 adjacent the junction 129 of the base and stem portions 122, 124.

The applied force causes the base portion 121 (and thus the movably positionable retainer 122) to move away from its biased position, thereby increasing the distance between the retainers 112, 122 and expanding the rail receptacle 130 to receive the DIN rail 140 and thus mount the circuit breaker 10 to it (FIG. 6b). This also causes an internal spring energy to be stored in the stem portion 124. When the applied external force is removed from the base portion 121, the energy stored in the stem portion 124 causes the base portion 121 to return to its biased position, with the movably positionable retainer 122 moving into position to secure the DIN rail 140 in the rail receptacle 130 in cooperation with the opposite retainer 112. In some embodiments, the biased position may exert a sufficient clamping force to resist any movement along the DIN rail 140. In other embodiments, the circuit breaker 10 may be retained loosely enough to still be slidable along the rail, which may be advantageous for final positioning. In either case, if the circuit breaker 10 is subsequently removed from the DIN rail 140, the circuit breaker 10 can be dismounted from the DIN rail 140 in the reverse manner in which it was originally mounted.

In a preferred embodiment, both housing members 110a, 110b include a socket 118 and linear latch guide 116, which provides for a more balanced distribution of force and movement of the base portion 121 of the latch member 120 in relation to the housing members.

By providing an L-shaped latch member 120 and positioning the tool receptacle 125 adjacent the junction 129, the fulcrum is maneuvered such that application of a force via the tool receptacle 125 results in less force being transferred to the junction 129, reducing the likelihood of overstressing and/or breaking the latch member 120.

The components of the housing 100 may be manufactured from any insulating material and are typically made of plastic by injection molding. Features of the housing components can be created in any manner known to those of skill in the art including direct molding of the features into the components and/or by subsequent machining.

While the foregoing specification illustrates and describes exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A circuit breaker for mounting to an elongated channel rail having laterally spaced oppositely projecting abutment flanges comprising:
    a circuit breaker housing comprising
        a first housing member;
        a second housing member complementary and attached to the first housing member, at least one of the first or second housing members having an elongated linear latch guide formed therein; and
        a latch member disposed intermediate the first and second housing members, the latch member comprising
            a base portion,
            a stem portion extending from the base portion at a junction, wherein the junction establishes a retainer segment having a length at least 75% of the total length of the base portion;
            a tool receptacle formed in the base portion adjacent the junction of the stem portion, and
            an elongated linear latch guide formed in the base portion cooperable with the at least one elongated linear latch guide formed in the housing member to establish a distance of maximum travel of the base portion,
        wherein the circuit breaker housing includes a rail receptacle for removably securing the circuit breaker housing to the elongated channel rail, the rail receptacle at least partially defined by oppositely disposed retainers extending inwardly toward the rail receptacle to at least partially surround the abutment flanges within the rail receptacle,
        wherein at least one of the retainers is movably positionable away from a biased position to receive the elongated channel rail in the rail receptacle upon application of an applied external force, the movably positionable retainer configured to return to the biased position in the absence of the applied external force,
        wherein the base portion of the latch member forms the movably positionable retainer and which moves toward or away from the biased position along a path of travel defined by the elongated linear latch guides and wherein the biased position is established by securing an end of the stem portion at a pre-determined location in at least one housing member.

2. The circuit breaker of claim 1, wherein the rail receptacle is sized for removably securing the circuit breaker housing to a DIN rail.

3. The circuit breaker of claim 1, wherein each of the first and second housing members has an elongated linear latch guide formed therein.

4. The circuit breaker of claim 1, wherein the elongated linear latch guide of the housing member is a protrusion and wherein the elongated linear latch guide of the latch member cooperable with the housing member elongated linear latch guide is a channel.

5. The circuit breaker of claim 1, wherein the elongated linear latch guide formed in the base portion is cooperable with the at least one elongated linear latch guide formed in the housing member to establish a distance of maximum travel of the base portion to expand the rail receptacle to a width substantially equal to the distance between the laterally spaced oppositely projecting abutment flanges of the elongated channel rail.

6. The circuit breaker of claim 1, wherein the end of the stem portion of the latch member secured at a pre-determined location comprises a rock shaft, wherein the rock shaft is pivotably secured in a corresponding socket of at least one housing member.

7. The circuit breaker of claim 1, wherein the junction establishes a retainer segment having a length at least 85% of the total length of the base portion.

8. The circuit breaker of claim 1, wherein the tool receptacle is immediately adjacent the junction of the base and stem portions of the latch member.

9. The circuit breaker of claim 1, wherein the base portion and the stem portion are of unitary construction.

10. The circuit breaker of claim 1, wherein the stem portion extends away from the base portion at substantially a right angle.

11. A circuit breaker housing comprising:
   a first housing member;
   a second housing member complementary and attached to the first housing member, each of the first and second housing members having an elongated linear latch guide formed therein; and
   an L-shaped latch member disposed intermediate the first and second housing members, the latch member comprising
      a base portion,
      a stem portion extending from the base portion at a junction, wherein the junction divides a retainer segment of the base portion from a tail segment of the base portion, the tail segment of the base portion having a length less than about one third the length of the retainer segment of the base portion;
      a tool receptacle formed in the base portion immediately adjacent the junction of the stem portion, and
      a pair of elongated linear latch guides formed in the base portion, each elongated linear latch guide respectively cooperable with one of the elongated linear latch guides formed in the housing members,
   wherein the circuit breaker housing includes a rail receptacle for removably securing the housing to an elongated channel rail having laterally spaced apart oppositely projecting abutments, the rail receptacle at least partially defined by oppositely disposed retainers extending inwardly toward the rail receptacle to at least partially surround the abutment flanges within the rail receptacle,
   wherein at least one of the retainers is movably positionable away from a biased position to receive the elongated channel rail in the rail receptacle upon application of an applied external force and the movably positionable retainer configured to return to the biased position in the absence of the applied external force,
   wherein the base portion of the latch member forms the movably positionable retainer and which moves toward or away from the biased position along a path of travel defined by the elongated linear latch guides and wherein the biased position is established by securing an end of the stem portion at a pre-determined location in each of the first and second housing members, and
   wherein the elongated linear latch guides formed in the housing member cooperate with the elongate linear latch guide formed in the latch member to establish a distance of maximum travel of the base portion to expand the rail receptacle to a width substantially equal to the distance between the laterally spaced oppositely projecting abutment flanges of the elongated channel rail.

12. The circuit breaker housing of claim 11, wherein the housing forms a rail receptacle sized to removably securing the housing to a DIN rail.

13. The circuit breaker housing of claim 11, wherein the end of the stem portion of the latch member secured at a pre-determined position comprises a rock shaft pivotably mounted in a corresponding socket in each of the first and second housing members.

14. The circuit breaker housing of claim 11, wherein the tail segment of the base portion has a length of less about one sixth the length of the retainer segment of the base portion.

15. The circuit breaker housing of claim 11, wherein the stem portion has a length of about one half the length of the base portion.

16. The circuit breaker housing of claim 11, wherein the latch member linear latch guide is a mortise-like channel and wherein the housing member linear latch guides are tenon-like protrusions, the channel being longer than the protrusions.

* * * * *